(12) United States Patent
Kohno et al.

(10) Patent No.: US 6,711,352 B2
(45) Date of Patent: Mar. 23, 2004

(54) RANGE FINDER OF LIGHT AMOUNT DETECTION TYPE WITH MULTI ZONE RESOLUTION

(75) Inventors: Takanori Kohno, Tokyo (JP); Tomio Kurosu, Iwatsuki (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 10/329,475

(22) Filed: Dec. 27, 2002

(65) Prior Publication Data

US 2003/0123869 A1 Jul. 3, 2003

(30) Foreign Application Priority Data

Dec. 28, 2001 (JP) ........................ 2001-400178
Apr. 1, 2002 (JP) ........................ 2002-098928
Apr. 1, 2002 (JP) ........................ 2002-098929

(51) Int. Cl.$^7$ ...................... G03B 13/36; G01C 3/08
(52) U.S. Cl. .................. 396/109; 396/106; 356/3.04
(58) Field of Search .................. 396/106, 108; 356/3.01–3.04, 4.07

(56) References Cited

U.S. PATENT DOCUMENTS

| | | | | |
|---|---|---|---|---|
| 4,322,141 A | * | 3/1982 | Tominaga et al. | ........ 396/106 |
| 6,275,658 B1 | * | 8/2001 | Zander | ........ 396/123 |
| 6,285,832 B1 | | 9/2001 | Ishii et al. | |
| 6,336,004 B1 | | 1/2002 | Ishii et al. | |

FOREIGN PATENT DOCUMENTS

| | | |
|---|---|---|
| JP | 06 313840 A | 11/1994 |
| JP | 08 334680 A | 12/1996 |
| JP | 2001 013248 A | 1/2001 |
| JP | 2001 013404 A | 1/2001 |

* cited by examiner

Primary Examiner—W. B. Perkey
(74) Attorney, Agent, or Firm—Nixon Peabody, LLP

(57) ABSTRACT

An optical range finder has a projection unit for projecting optical flux to an object, a photoreceiving unit for receiving the optical flux returned from the object and outputting a detection signal in accordance with a light quantity of the received optical flux, and a circuitry unit for conducting a measurement of a distance to the object based on the detection signal. In the circuitry unit, a light quantity determination circuit compares a signal level of the detection signal with a reference level to carry out binary determination of the light quantity of the returned optical flux. A reference level setting circuit switchably supplies a plurality of reference levels to the light quantity determination circuit, the reference levels being preset in correspondence to multiple stages of the distance. A control circuit controls the reference level setting circuit to supply the reference levels while switching the reference levels so as to enable the light quantity determination circuit to execute a plurality of the binary determination with the supplied reference levels for one measurement, thereby specifying the distance to one of the multiple stages based on the thus obtained plurality of the binary determination.

15 Claims, 12 Drawing Sheets

FIG. 3

| STAGES | DISTANCE | SEQUENCE | PHOTOELECTRIC CURRENT | RELATIVE PHOTOELECTRIC CURRENT |
|---|---|---|---|---|
| ⓪ | 8(m) | H | 0.25 | 1.56(%) |
| ① | 4 | H/2 | 1 | 6.3 |
| ② | 2.67 | H/3 | 2.25 | 14.1 |
| ③ | 2 | H/4 | 4 | 25 |
| ④ | 1.6 | H/5 | 6.256 | 39.1 |
| ⑤ | 1.33 | H/6 | 9.04 | 56.3 |
| ⑥ | 1.14 | H/7 | 12.3 | 76.5 |
| ⑦ | 1 | H/8 | 16 | 100 |

FIG. 5

| DETERMINATION STAGE | CURRENT SOURCE | | | RELATIVE SET CURRENT | RELATIVE LIGHT QUANTITY (%) | (DETERMINATION POINT DISTANCE) (m) |
| --- | --- | --- | --- | --- | --- | --- |
| | 1 | 2 | 4 | 8 | | |
| ① (FARTHEST) | O | | | | 1 | 6.3 | (4) |
| ② | | O | | | 2 | 12.5 | (2.83) |
| ③ | | | O | | 4 | 25 | (2) |
| ④ | | O | O | | 6 | 37.5 | (1.63) |
| ⑤ | O | | | O | 9 | 56.3 | (1.34) |
| ⑥ | | O | O | O | 12 | 75 | (1.15) |
| ⑦ | O | O | O | O | 15 | 93.8 | (1.03) |

FIG. 6

| DETERMINATION STAGE | CURRENT SOURCE (RELATIVE CURRENT NOTATION) | | | | RELATIVE SET CURRENT | RELATIVE LIGHT QUANTITY (VALUE 16 IS SET TO 100%) | CORRESPONDING DISTANCE (m) |
|---|---|---|---|---|---|---|---|
| | 1 | 2 | 4 | 8 | | | |
| ① | O | | | | 1 | 6.3 | 4 |
| ② | O | O | | | 3 | 18.8 | 2.31 |
| ③ | O | | O | | 5 | 31.3 | 1.79 |
| ④ | O | O | O | | 7 | 43.8 | 1.51 |
| ⑤ | O | | | O | 9 | 56.3 | 1.33 |
| ⑥ | O | O | | O | 11 | 68.8 | 1.21 |
| ⑦ | O | | O | O | 13 | 81.3 | 1.11 |
| ⑧ | O | O | O | O | 15 | 93.8 | 1.03 |

RANGE FINDER OF LIGHT AMOUNT DETECTION TYPE WITH MULTI ZONE RESOLUTION

BACKGROUND OF THE INVENTION

The present invention relates to an optical range finder incorporated in a camera or the like to be used for automatic focus adjustment. More specifically, the invention relates to a technology for obtaining measurement accuracy by making distance determination multistage. The invention also relates to a multistage determination process or algorithm. In addition, the invention relates to a light quantity calibration technology.

FIG. 12 is a schematic perspective view showing an example of a camera incorporating a conventional optical range finder. A camera 25 is provided with a lens barrel 27 on a front of a body 26. The optical range finder composed of a projection unit 1 and a photoreceiving unit 2 is mounted to the body 26. The projection unit 1 projects optical flux to an object located in an optical axis direction. The photoreceiving unit 2 receives the optical flux returned from the object, and outputs a detection signal in accordance with a light quantity of the received optical flux. The optical range finder determines a distance to the object based on the detection signal outputted from the photoreceiving unit 2, and executes ranging by using a relation that a reflected light quantity from the object is inversely proportional to a square of the distance.

FIG. 13 is a schematic view showing a specific constitution of the conventional optical range finder. The projection unit 1 and the photoreceiving unit 2 are assembled into a holding frame 30. This holding frame 30 is supported on a circuit board 4a. The circuit board 4a is attached in the body 26 of the camera 25 shown in FIG. 12. The projection unit 1 is constituted of a projection lens 1b mounted to a front of the holding frame 30, and a light emitting element 1a for emitting optical flux such as infrared rays to the lens 1b. On the other hand, the photoreceiving unit 2 is constituted of a lens 2b mounted to the front of the holding frame 30 to converge the optical flux returned from the object, and a light detecting element 2a arranged oppositely to the lens 2b. The light detecting element 2a outputs a detection signal having a current amount in accordance with the received light quantity. A circuitry unit assembled in the circuit board 4a processes the detection signal to execute ranging.

The optical range finder of the light quantity type is simple in structure compared with a range finder based on a principle of triangulation. Accordingly, in the conventional optical range finder, a binary system for determining a distance in two stages, i.e., far and short distance zones, is often used. That is, the circuitry unit of the optical range finder is provided with a comparator for comparing the detection signal with a predetermined reference level to determine whether the object is located in a far distance side or a short distance side. As the optical range finder executes ranging based on a light quantity reflected from the object, accuracy is not so high because of factors described below, and it has been considered improper to increase accuracy from the conventional two-stage determination to multistage determination of three stages or more. As the light quantity depends on a reflectance of the object (target of the camera or the like), measurement accuracy cannot be obtained, and it has been considered meaningless to set multiple stages. In addition, circuitry needs only one comparator in the case of binary determination, and is very simple, and importance has been placed on practical rationality. For a request of setting of multiple stages, a system based on a normal triangular ranging system is suited, and there has been no point in setting multiple stages in the optical range finder of the light quantity type.

However, following recent diversification of cameras, low cost and miniaturization have been requested of the range finder used for automatic focus adjustment or the like. Thus, there has been a demand for setting multiple stages in the optical range finder of the light quantity type, which is advantageous in cost and size. The present invention proposes setting of multiple stages in the optical range finder of the light quantity type.

In the case of executing determination of the light quantity reflected from the object in multiple stages, a complicated system might be employed, which prepares a plurality of determination circuits in accordance with the number of stages, and a plurality of reference levels in accordance with a variable light quantity. Alternatively, means may be employed, which directly measures a level of a reflected light quantity and converts it into numerical value data, and calculates object distance information based on a physical relation between the distance and the light quantity. However, the above-described measures both result in complex circuitry, and thus they are not suitable for the optical range finder which should be simple ranging means. In a general purpose optical range finder, simple determination of far and near stages is executed, the number of reference levels is one, and a circuit is very simple. In the market, there is a demand for means making the optical range finder multistage without complicating circuitry, which is now a problem to be solved. In this case, a process or algorithm of multistage determination is also a problem to be solved. In addition, if the optical range finder of the light quantity type is made multistage, ranging accuracy becomes higher than the conventional bi-stage type and, accordingly, error factors must be suppressed. In such a case, it is considered effective to execute calibration of a light quantity of projected beam beforehand, which is also a problem to be solved.

SUMMARY OF THE INVENTION

In order to solve the foregoing problems of the prior art, first means has been contrived. That is, the present invention is directed to an optical range finder having a projection unit for projecting optical flux to an object, a photoreceiving unit for receiving the optical flux returned from the object and outputting a detection signal in accordance with a light quantity of the received optical flux, and a circuitry unit for conducting a measurement of a distance to the object based on the detection signal, wherein the circuitry unit comprises a light quantity determination circuit for comparing a signal level of the detection signal with a reference level to carry out binary determination of the light quantity of the returned optical flux, a reference level setting circuit for switchably supplying a plurality of reference levels to the light quantity determination circuit, the reference levels being preset in correspondence to multiple stages of the distance, and a control circuit for controlling the reference level setting circuit to supply the reference levels while switching the reference levels so as to enable the light quantity determination circuit to execute a plurality of the binary determination with the supplied reference levels for one measurement, thereby specifying the distance to one of the multiple stages based on the thus obtained plurality of the binary determination.

Preferably, the reference level setting circuit sets the reference levels in correspondence to the multiple stages of the distance where inverse numbers of the distance of the multiple stages are arranged in an arithmetic series. For example, the reference level setting circuit sets the reference levels in correspondence to the multiple stages of the distance where the distance is divided into the multiple stages based on a harmonic sequence (1/2, 1/3 . . . 1/n). Preferably, the reference level setting circuit comprises a plurality of current supplies arranged in parallel with each other to output different current amounts, the plurality of the current supplies being set so that the respective current amounts may be arranged in a geometric series where 2 is a base, and a switch for switchably combining the current supplies to generate a multiple of current amounts such that the multiple of the current amounts are supplied to the light quantity determination circuit as the reference levels. In such a case, the plurality of the current supplies comprise a single current source and a plurality of resistive elements connected to the single current source to define the plurality of the current supplies generating the respective current amounts, the resistive elements having resistance values set in the geometric series where 2 is a base. The plurality of the current supplies may include a current supply for outputting a minimum current amount appropriate to a reference level corresponding to the farthest stage of the distance. The plurality of the current supplies may comprise at least four current supplies where the respective current amounts are set to 1:2:4:8, and these four current supplies are combined to set the multiple of the current amounts appropriate for the reference levels corresponding to the stages of the distance. The four current supplies may include a current supply which outputs a minimum current amount and which is always combined to the remaining current supplies in providing any of the reference levels.

According to the present invention, by directly using the light quantity determination circuit constituted of only one comparator incorporated in the general purpose optical range finder, ranging can be made multistage. The plurality of reference levels are supplied in a switchable manner to the single light quantity determination comparator. When one ranging is executed, the reference levels are switched to execute a plurality of determinations and, based on the thus obtained results, an object distance is measured. For example, the plurality of reference levels set corresponding to the divided distance stages of three zones or more are sequentially supplied to the comparator to repeatedly execute binary light quantity determination. Then, when an output of the comparator is reversed, the distance stage corresponding to the reference level can be set as a ranging value.

Furthermore, second means has been contrived to solve the technical problems of the prior art. That is, the present invention is directed to an optical range finder having a projection unit for projecting optical flux to an object, a photoreceiving unit for receiving the optical flux returned from the object and outputting a detection signal in accordance with a light quantity of the received optical flux, and a circuitry unit for conducting a measurement of a distance to the object based on the detection signal, wherein the circuitry unit comprises a light quantity determination circuit for comparing a signal level of the detection signal with a reference level to effect a binary determination of the light quantity of the returned optical flux, a reference level setting circuit for switchably supplying a plurality of reference levels to the light quantity determination circuit, the reference levels being preset in correspondence to multiple stages of the distance, and a control circuit for controlling the reference level setting circuit to sequentially supply the reference levels based on an algorithm while switching the reference levels so as to enable the light quantity determination circuit to sequentially execute sessions of the binary determination with the supplied reference levels for one measurement, thereby specifying the distance to one of the multiple stages according to the algorithm based on the sessions of the binary determination, where the algorithm is designed to specify the distance to one of a far zone and a near zone over the multiple stages of the distance at an initial session of the binary determination, then specify the distance to one of a far sub-zone and a near sub-zone within the specified one of the far zone and the near zone at a next session of the binary determination, and specify the distance to one of the multiple stages within the specified one of the far sub-zone and the near sub-zone at a further session of the binary determination.

Preferably, the algorithm is designed to enable the light quantity determination circuit to repeat a comparison of the signal level of the detection signal with the reference level and to count the results of the comparison in terms of a far side and a near side, such that one session of the binary determination of the light quantity is finished when the count of either of the far side and the near side reaches a predetermined number. Further, the algorithm is designed to enable the light quantity determination circuit to settle a current session of the binary determination in reverse to a previous session of the binary determination when a result of the comparison reverse to those results of the comparison involved in the previous session appears in the current session of the binary determination. Moreover, the algorithm is designed to enable the light quantity determination circuit to make a next session of the binary determination final when a current session of the binary determination involves split results of the comparison splitting between the far side and the near side, thereby specifying the distance to one of the multiple stages at the next session of the binary determination.

According to the present invention, by directly using the light quantity determination circuit constituted of only one comparator incorporated in the general purpose optical range finder, ranging can be made multistage. The plurality of reference levels are supplied in a switchable manner to the single light quantity determination comparator. When one ranging is executed, the reference levels are switched to execute a plurality of determinations and, based on the thus obtained results, an object distance is measured. In a conventional optical ranging, a determination level is set to one point, and far and near binary determination is executed for the set level. A ranging zone at this time is wide. On the other hand, according to the present invention, determination levels are prepared in multiple stages, the levels are switched to execute multi-stage determination, and each distance zone is narrowed, whereby ranging accuracy is increased. In this case, because of the need to execute a number of binary determinations by switching the levels, ranging time is extended. On the other hand, since intervals of determination zones are narrowed, a required level of determination accuracy becomes higher compared with that of the conventional case. Under these circumstances, according to the present invention, ranging time and determination accuracy are balanced, and then a rational determination algorithm is used. That is, in execution of multistage determination, a process is beforehand programmed to properly switch determination levels to realize shortest measurement. Specifically, determination level setting is placed at an intermediate stage of the determination zones, and the process further proceeds to a sub-divided intermediate stage in the selected zone. In this way, compared with the case of sequentially scanning up or down the determination levels, the total number of determinations can be reduced. Moreover, an algorithm is employed, which sets a present determination result in accordance with a previous determination result to thereby minimize the number of determinations.

In addition, third means has been contrived to solve the technical problems of the prior art. That is, the present invention is directed to an optical range finder having a projection unit including a light emitting element for projecting optical flux to an object, a light quantity adjusting unit for provisionally adjusting a light quantity of the projected optical flux, a photoreceiving unit for receiving the optical flux returned from the object and outputting a detection signal in accordance with a light quantity of the received optical flux, and a circuitry unit for conducting a measurement of a distance to the object based on the detection signal, wherein the circuitry unit comprises: a light quantity determination circuit for comparing a signal level of the detection signal with a reference level to carry out binary determination of the light quantity of the returned optical flux; a reference level setting circuit for switchably supplying a plurality of reference levels to the light quantity determination circuit, the reference levels being preset in correspondence to multiple stages of the distance, and a control circuit for controlling the reference level setting circuit to supply the reference levels while switching the reference levels so as to enable the light quantity determination circuit to execute a plurality of the binary determination with the supplied reference levels for one measurement, thereby specifying the distance to one of the multiple stages based on the thus obtained plurality of the binary determination, and wherein the light quantity adjustment unit comprises a group of parallel resistive elements which are selectively connected in parallel to the light emitting element for forming bypasses of electric currents flowing through the light emitting element to thereby execute a primary adjustment of the light quantity, and another group of serial resistive elements which are selectively connected in series to the light emitting element for regulating the electric current flowing through the light emitting element to thereby execute a secondary adjustment of the light quantity.

Preferably, the group of the serial resistive elements are set so that respective resistance values of the serial resistive elements may be arranged in a geometric series where 2 is a base. Preferably, the light emitting element is driven under constant voltage control. Otherwise, the light emitting element is driven under constant current control.

According to the present invention, by directly using the light quantity determination circuit constituted of only one comparator incorporated in the general purpose optical range finder, ranging can be made multistage. The plurality of reference levels are supplied in a switchable manner to the single light quantity determination comparator. When one ranging is executed, the reference levels are switched to execute a plurality of determinations and, based on the thus obtained results, an object distance is measured. For example, the plurality of reference levels set corresponding to the divided distance stages such as three stages or more are sequentially supplied to the comparator to repeatedly execute light quantity determination. Then, when an output of the comparator is reversed, the distance stage corresponding to the reference level can be set as a ranging value.

Incidentally, in the conventional light quantity ranging, far and near binary determination is executed where a determination level is one stage, distance setting zone of each of far and near stages is wide, and a required level of determination accuracy is low. However, if a determination level is made multistage according to the present invention as described above, since a distance range for one stage is narrowed, higher determination level accuracy is required.

In the light quantity ranging, various error factors are involved because an absolute value of the light quantity is set as a signal. For example, variances in light emission degrees of components such as transmittances of the light emitting element, the light detecting element, and the lens, determination level setting, and processing circuits for executing ranging have been error factors.

As described above, variance factors of the light quantity signal are wide-ranging, and a variance width is large. Normally, the error factors may be dealt with by adjusting determination level setting. However, if determination steps are set for multistage ranging corresponding to a relative light quantity as in the case of the present invention, adjustment must be executed in multiple stages, and therefore this method cannot be employed. Thus, absolute value adjustment of the light quantity must be executed by another function, which requires an adjustment method of wide-ranging calibration.

Thus, according to the present invention, the light quantity is adjusted by a drive current of the light emitting element such as an infrared-emitting diode (IRED). In the case of multistage ranging, adjustment accuracy of the drive current can be set sufficiently small with respect to a relative light quantity step and, in order to permit and absorb variance in various components. Thus, according to the present invention, a group of parallel resistive elements is used to enable primary adjustment, and another group of serial resistive elements is used to enable secondary adjustment. The group of parallel resistive elements is connected in parallel to the light emitting element so as to be selected, a bypass of the drive current flowing through the light emitting element is formed to enable level shifting, whereby an adjustment width is enlarged. On the other hand, the group of serial resistive elements is serially connected to the light emitting element selectively, and combined resistance is finely set to regulate the current flowing through the light emitting element at fine levels.

BRIEF DESCRIPTION OF THE DRAWINGS

FIG. 3 is a table view showing a setting example of distance stages.

FIG. 5 is a table view showing an example of current level setting for determination.

FIG. 6 is a table view showing another example of current level setting for determination.

DETAILED DESCRIPTION OF THE INVENTION

Figure 1A:
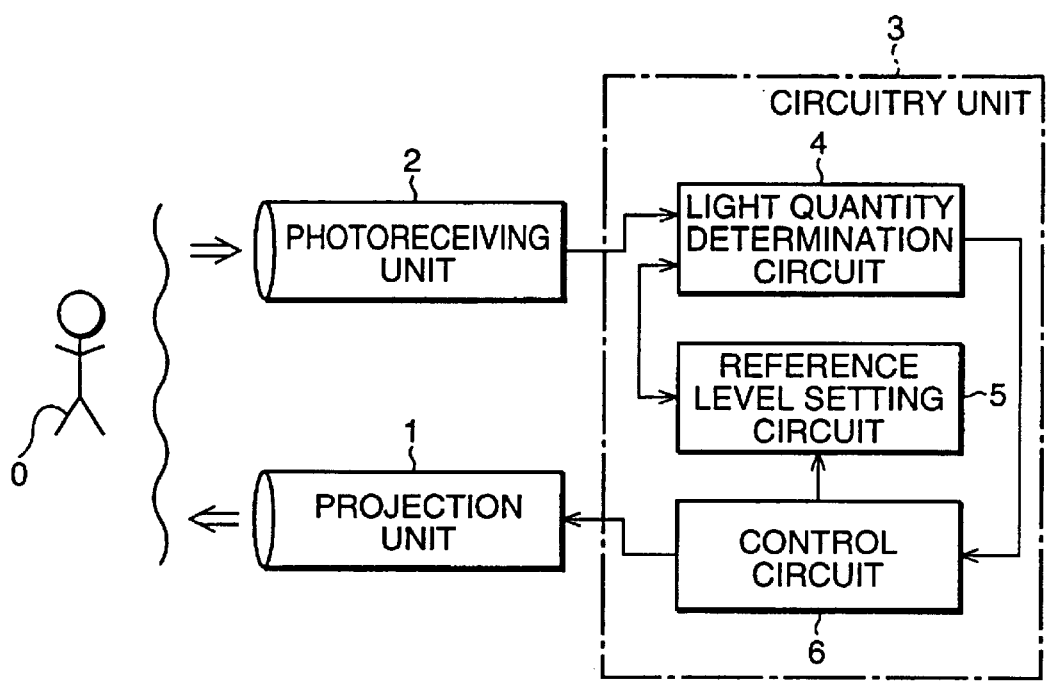
FIGS. 1(A) and 1(B) are schematic diagrams showing a constitution and operation of an optical range finder of the present invention.
Figure 1B:
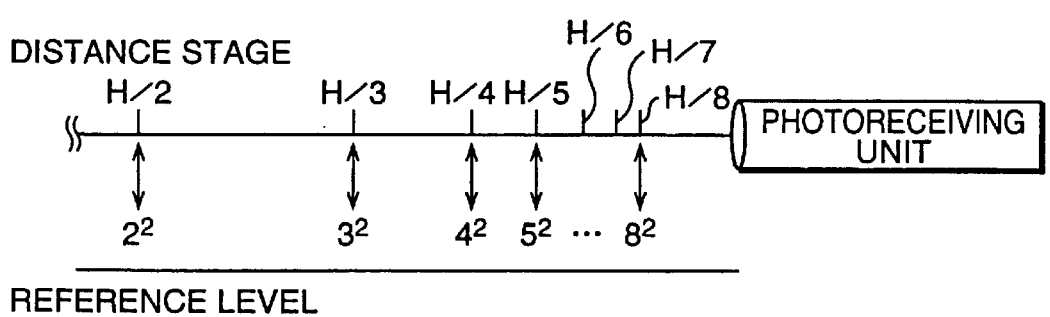
Figure 13:
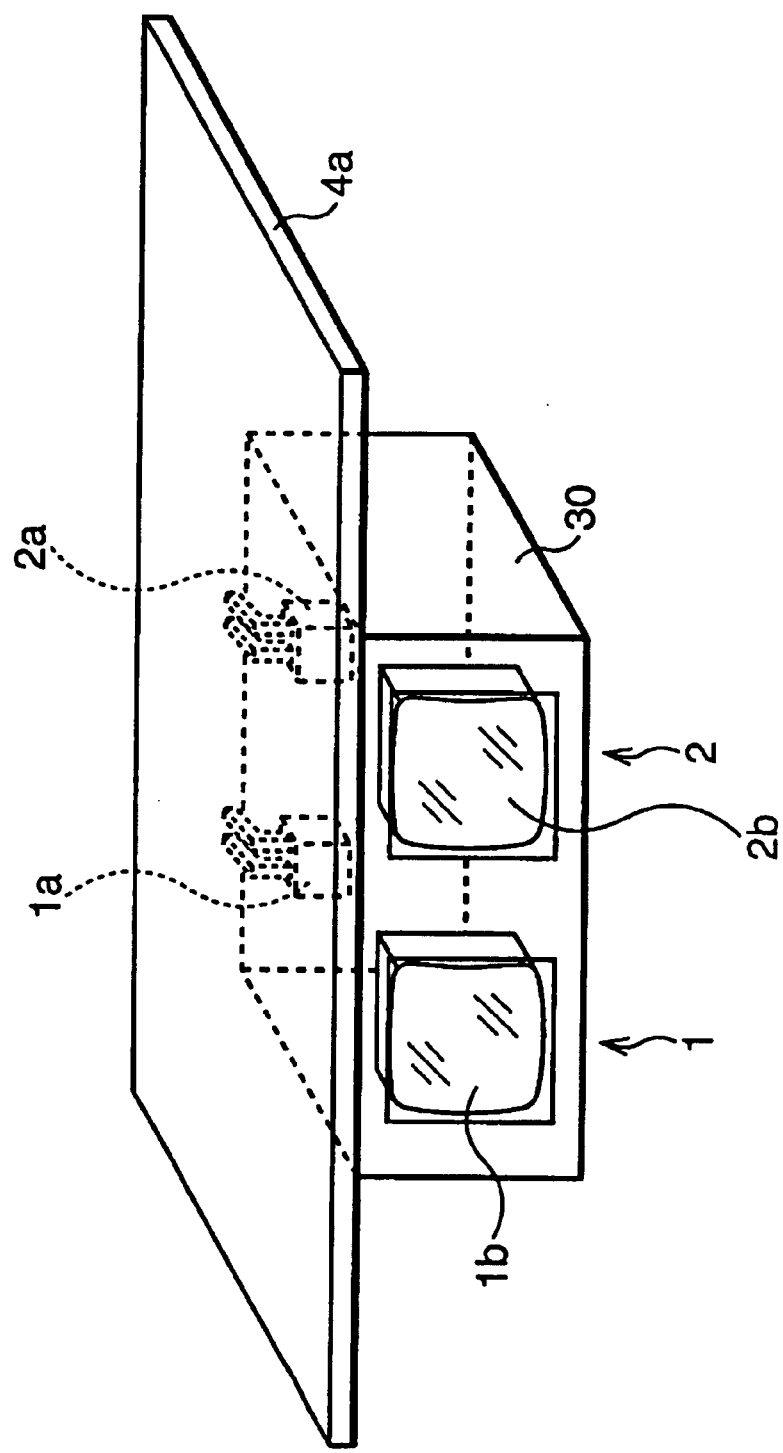
FIG. 13 is a schematic perspective view of the conventional range finder of the light quantity type.

Next, detailed description will be made of the preferred embodiments of the present invention with reference to the accompanying drawings. FIGS. 1(A) and 1(B) are schematic diagrams illustrating a constitution and operation of a light quantity type multistage rage finder according to the present invention. As shown in FIG. 1(A), the optical range finder is constituted of a projection unit 1, a photoreceiving unit 2, and a circuitry unit 3 as basic components. These physical components are as shown in FIG. 13. The projection unit 1 includes an infrared-emitting diode, a lens and the like, and projects optical flux to an object 0. The photoreceiving unit 2 includes a lens, and a light detecting element such as a photodiode, and receives the optical flux reflected and returned from the object 0. The lens may use a converging function of the used light detecting element, and the lens may be omitted depending on the used light quantity. The light detecting element outputs a detection signal in accordance with the received light quantity, for example at a current level. The circuitry unit 3 measures a distance to the object 0 based on the detection signal outputted from the photoreceiving unit 2 in multiple stages.

The circuitry unit 3 is constituted of a light quantity determination circuit 4, a reference level setting circuit 5, and a control circuit 6. The light quantity determination circuit 4 includes a comparator for comparing a level of the detection signal based on the light quantity with a predetermined reference level to determine the light quantity. The reference level setting circuit 5 supplies in a switchable manner a plurality of reference levels preset in multiple stages in accordance with a distance. The control circuit 6 controls the reference level setting circuit 5 to execute a plurality of determinations for one measurement while switching the reference levels, and species a distance to the object 0 based on the thus obtained results.

According to a specific constitution, the reference level setting circuit 5 sets the reference levels in multiple stages corresponding to each of distance stages divided based on a harmonic sequence (1/2, 1/3 ... 1/n) starting from 1/2. For example, the reference level setting circuit 5 includes a plurality of current supplies arranged in parallel with each other to output different current amounts, and a switch for combining the current supplies to generate a multistage current amount, and supplies the multistage current amount as a multistage reference level to the light quantity determination circuit 4. In this case, the plurality of current supplies is set so that the current amounts may be arranged in a relation of a geometrical sequence with each other while 2 is a base. Specifically, for the plurality of current supplies, in order to set each allocated current amount, a resistive element is used, in which a current setting resistance value of one current supply is arranged in a relation of a geometrical sequence while 2 is a base. Among the plurality of current supplies, a current supply which outputs a minimum current amount supplies a current amount appropriate to a reference level corresponding to a farthest distance stage.

According to the embodiment, for the plurality of current supplies, there are at least 4 current supplies where current amounts are set to 1:2:4:8, and these are combined to set a current amount appropriate to a reference level of each stage. From the standpoint of digital calculation, the 4 current supplies correspond to a binary 4-bit constitution, whereby reference level of $2^4=16$ stages can be provided at a maximum. In some cases, among the current supplies of the 4-bit constitution, a current supply outputting a minimum current supply corresponding to a least significant bit can be included in a combination at any reference levels. In this case, the plurality of current supplies substantially become a high 3-bit constitution excluding least significant 1 bit, whereby reference levels of $2^3=8$ stages can be provided.

Next, by referring to FIG. 1(B), setting of distance stages and corresponding reference levels will be described. In the case of applying the optical range finder of the present invention to an automatic focus adjustment of a camera, it is rational to make a ranging step correspond to a lens setting step in automatic focus adjustment. Generally, the lens setting step in the automatic focus adjustment is designed such that an image blurring amount by photographing can be uniform at the respective stages. Such step setting is represented by an excessive focus sequence of H, H/2, H/3, H/4 ... H/n. Here, if focus is set on an infinite distance, the excessive focus H indicates a distance where the focus is practically set from H to the infinite distance. Accordingly, the excessive focus sequence is a harmonic sequence where H is a numerator. According to the present invention, distance stages are set corresponding to this excessive focus sequence. In the example shown in FIG. 1(B), a distance from the infinite distance to H/2 is a first stage. H can be set to a boundary of a first stage instead of H2. In practice, however, as a distance is farther, a light quantity is smaller, and thus accuracy cannot be obtained. Therefore, H/2 is set as the first set stage from a practical standpoint. Subsequently, H/3 is set as a second stage, and sequentially set thereafter until H/8 is set as a last stage. In this way, the distance to the object can be determined in multiple stages, i.e., 8 stages.

If the distance stages are set in accordance with the excessive focus sequence starting from H/2, reference levels corresponding to the respective distance stages are given by $2^2, 3^2, 4^2, 5^2, \ldots, 8^2$. As well known, a received light quantity is in inverse proportion to a square of a distance. Thus, if a received light quantity from the object at the excessive focus H is 1, a reflected light quantity from H2 is inversely proportional to (1/2)2, and thus becomes a multiple of $2^2=4$. Similarly, thereafter, a reference level $3^2$ corresponds to the distance stage H/3, a reference level $4^2$ to H4, and a reference level $8^2$ to the distance stage H/8. As apparent from the drawing, as the distance to the object is closer, a received light quantity is steeply increased, and accordingly a reference level is also increased steeply.

Figure 2:
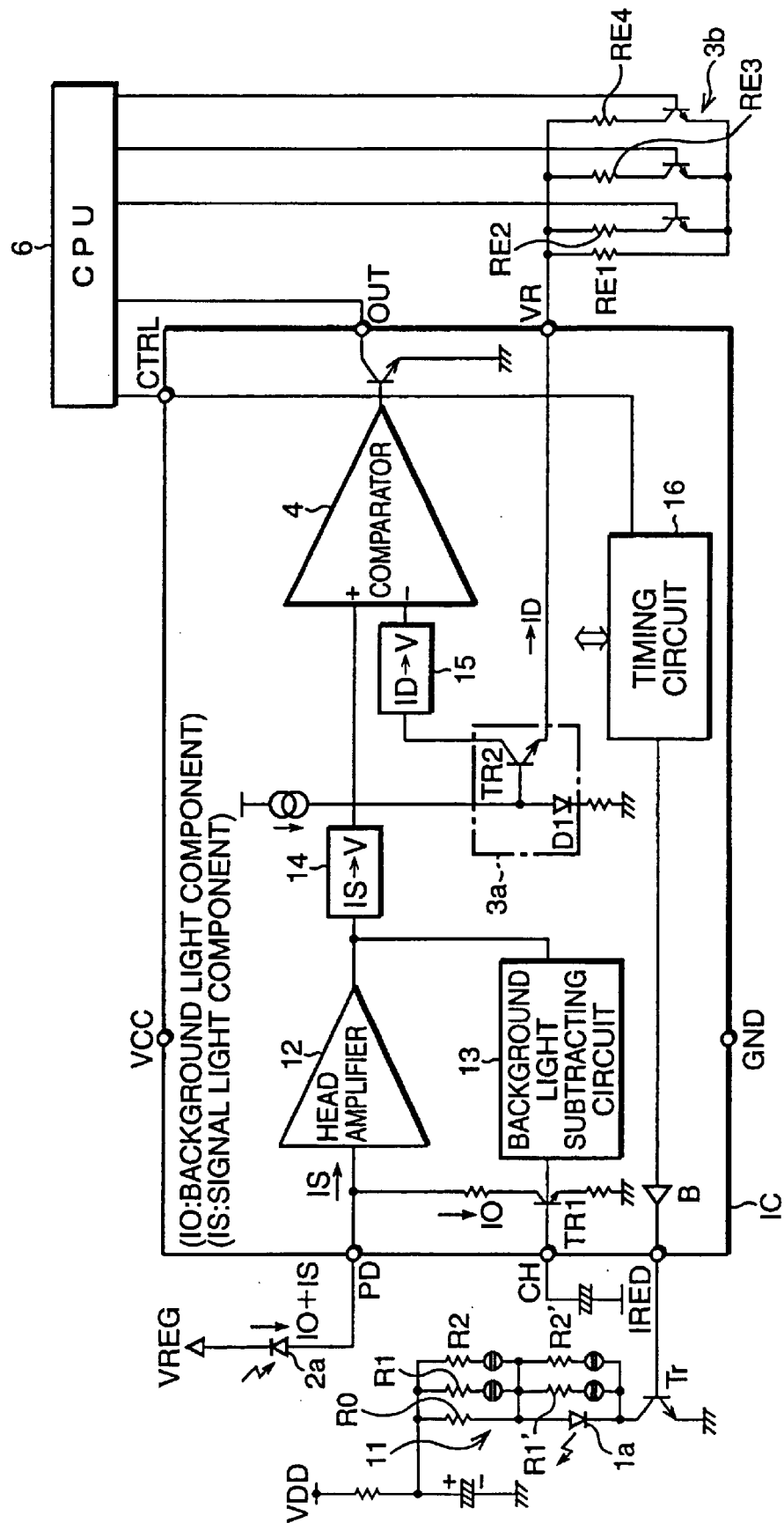
FIG. 2 is a circuit diagram showing a specific constitutional example of the optical range finder of the present invention.

FIG. 2 is a circuit diagram showing a specific constitutional example of the optical range finder of the present invention. As shown, the optical range finder includes an infrared LED (IRED) 1a for projecting infrared rays to the object, and a photodiode (IRED) 2a for receiving a reflected light from the object to output a corresponding detection signal. The LED 1a and the photodiode 2a are connected to a light quantity ranging IC. This IC is provided with 8 terminals IRED, CH, PD, VCC, VCTRL, OUT, VT, and GND. The infrared LED 1a is connected through a driving transistor Tr to the terminal IRED, and the photodiode 2a to the terminal PD. A capacitor is connected to the terminal CH. Power supply voltage is supplied to the terminal VCC, and the terminal GND is grounded. A CPU 6 constituting a control circuit is connected to the terminal CTRL. The CPU 6 is also connected to the output terminal OUT. In addition, an external current setting circuit 3b is connected to the terminal VR.

In the light quantity ranging IC, a head amplifier 12, a background light subtracting circuit 13, a current voltage conversion circuit 14, a similar current voltage conversion circuit 15, a timing circuit 16, a constant current circuit 3a, a comparator 4, and the like are formed to be integrated. The comparator 4 constitutes the above-described light quantity determination circuit, and its output is connected from the output terminal OUT through a transistor buffer to the CPU 6 side. The constant current circuit 3a and the current setting circuit 3b are interconnected through the terminal VR, and combined to constitute the above-described reference level setting circuit 3.

The background light subtracting circuit 13 receives received light current IO+IS from the photodiode 2a, and removes a background component IO by background light drawing to extract a valid signal component IS. The background component IO can be beforehand measured in a state where no light is emitted from the infrared LD LED 1a. The valid signal component IS is amplified, and then converted into a voltage signal at the converter 14 to be supplied to a positive input terminal of the comparator 4. The background component IO is removed through the transistor TR1 by the background light subtracting circuit 13.

The simple constant current circuit 3a is constituted of a transistor TR2 and a diode D1. Base voltage of the TR2 is fixed, and current setting is executed at an emitter resistor RE. In order to increase accuracy more, the constant current circuit may be constituted by using an operational amplifier. The emitter resistor RE is disposed in the current setting circuit 3b side.

The comparator 4 compares set current ID outputted from the constant current circuit 3a with photoelectric current IS, and its output becomes a binary of H/L. In the embodiment, the photoelectric current IS is converted into corresponding voltage at the converter 14, and the set current ID is also converted into voltage at the converter 15. The comparator 4 compares both voltages with each other, and an output takes a binary value based on a size thereof.

The external emitter resistor RE is connected from the terminal VR and, at the constant current circuit 3a, current setting proportional to 1/RE is executed. For the emitter resistor RE, 4 resistive elements RE1 to RE4 are connected in parallel, and a switch is disposed in each resistor, whereby switching of connections thereof can be controlled by the CPU 6. Resistance values of the 4 resistors RE4 to RE1 are set to 1:2:4:8, which correspond to a so-called binary 4-bit constitution. The RE1 corresponds to a least significant bit, and the RE4 corresponds to a most significant bit. By properly combining the resistive elements of the 4-bit constitution, current setting can executed up to $2^4=16$. In some cases, as shown, the RE1 corresponding to the least significant bit may be always connected, and current levels of $2^3=8$ may be set substantially at a 3-bit constitution.

A pulse is supplied to the infrared LED 1a by the timing circuit 16. The infrared LED 1a executes power backup by a capacitor C. A resistor group R connected to the LED 1a is used to limit emission current, and photoelectric current of the photodiode side 2a adjusts the emission current limit resistor R so as to be a set value. As this adjustment normally needs to be executed once at an assembling stage, a plurality of emission current limit resistors 11 is properly connected by a solder switch or the like at the adjustment stage. Each part of the above-described light quantity ranging IC is controlled for operation by the timing circuit 16.

FIG. 3 is a table view showing a specific example of step setting. As described above, for setting of the ranging step, ideally, the setting is executed such that a blurring amount of a formed image by the setting step of a photographic lens can be uniform. In the automatic focus adjustment of the camera, since a farthest determination point is decided based on a projection capability, the above-described rule may not be applied to the farthest point. In this case, preferably, setting is arranged by placing importance on a focus of an always used area in terms of a photographing frequency. Generally, lens setting stages are set based on an excessive focus sequence corresponding to a lens object depth. Here, an excessive focus is given by $H=f2/\Delta \cdot F$. A symbol $\Delta$ denotes a permissible circle diameter of confusion, a code f denotes a lens focal distance, and F an F value of the lens. For example, when $\Delta=0.03$ mm, $f=31$ mm, and $F=4$, $H=8$ m is set. Here, as shown in FIG. 3, the excessive focus sequence is represented by H, H/2, H/3 . . . H/n. In this sequence, (1/distance) has an arithmetic relation. Accordingly, irrespective of the above-described sequence, the (1/distance) is made arithmetic to make uniform the permissible circle diameter of confusion caused by a step, whereby a blurring amount can be made uniform in the ranging area. The optional number of stages can be set in accordance with the system. In the embodiment, correspondingly, the number of stages is decided as in the case of (1) to (7). Since a reflected light quantity is very small at the stage 0 corresponding to the excessive focus H as described above, accuracy is bad to make the stage impractical. Thus, in the embodiment, stages are set to (1) to (7), and ranging is executed in 8 stages.

The table view of FIG. 3 also shows a theoretical photoelectric current value corresponding to each stage. As described above, the reflected light quantity is inversely proportional to a square of a distance. As photoelectric current outputted from the photodiode is normally proportional to a received light quantity, the photoelectric current also becomes inversely proportional to the square of the distance after all. If photoelectric current is 1 at the stage (1), photoelectric current becomes 2.25 at the stage (2), and photoelectric current becomes 4 at the stage (3). Thereafter, at the last stage (7), photoelectric current becomes 16. A ratio when photoelectric current is 100% at the last stage (7) is cited as a relative photoelectric current on the rightmost side of the table view of FIG. 3. If 100% is set at the stage (7), 6.5% is set at the stage (1), and thus there is a large difference.

Figure 4:
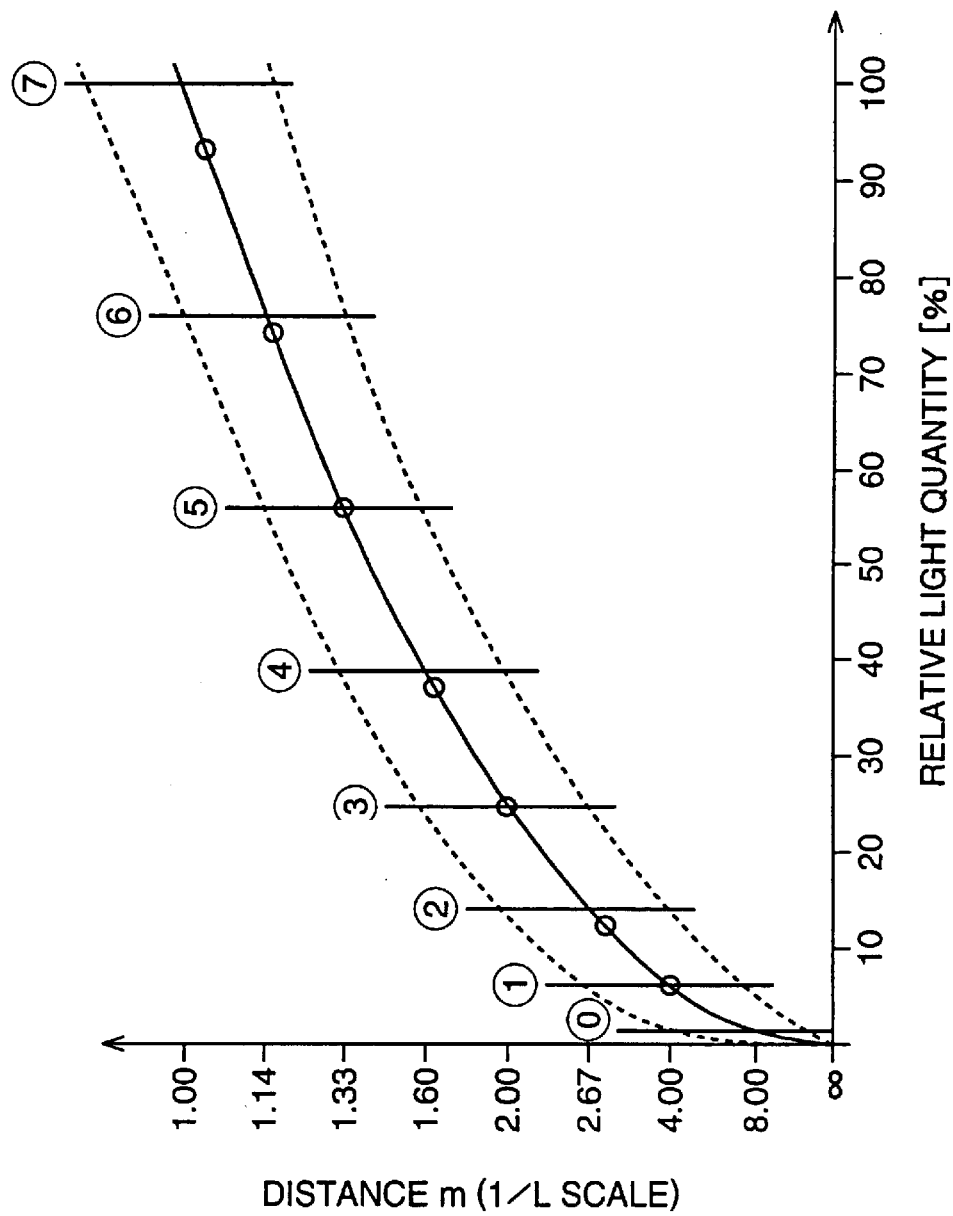
FIG. 4 is a graph showing a relation between a distance and a relative light quantity.

FIG. 4 is a graph showing a relation between the distance and the photoelectric current shown in FIG. 3. A distance (m) is taken by an inverse number memory in an ordinate, and a relative light quantity (%) is taken in an abscissa. In this graph, each of the stages (1) to (7) set in FIG. 3 is entered by a vertical bar. Dotted lines located above and below a characteristic curve of a distance/relative light quantity represented by a solid line represent a distance width permitting a shift of one stage.

FIG. 5 is a table view showing an example of current setting for reference levels corresponding to the set stages in FIGS. 3 and 4. As described above, the current setting is a combination of the constant current supplies of the 4-bit constitution. To facilitate understanding, in the table view of FIG. 5, constant sources are represented by 1, 2, 4, and 8 corresponding to a least significant bit to a moist significant bit. By combining these current supplies, current is set to approach a theoretical value of each setting stage as much as possible. For example, at the stage (1), reference current is set only by a least significant bit, and its ratio is set to 1. At the stage (2), a 2nd bit is used. Similarly thereafter, relative set currents are set, from the stage (1) to the stage (7), to 1, 2, 4, 6, 9, 12, and 15. In a scale similar to that of the relative photoelectric current in the table view of FIG. 3, a numerical value converted into a relative light quantity is shown in a table of FIG. 5.

A relative light quantity corresponding to a relative set current of each stage is added by a mark 0 to the graph of FIG. 4. As apparent from FIG. 4, current setting combining the constant current supplies of the 4-bit constitution corresponds to a theoretical value allocated to each of the stages (1) to (7). Thus, according to the present invention, reference levels corresponding to the excessive focus sequence can be easily switched by digital control of the CPU.

FIG. 6 is a table view showing another example of current setting. A difference from the previous example of FIG. 5 is that a constant current supply corresponding to a least significant bit is always connected, and current setting is executed substantially by a combination of upper 3 bits. In this example, different from the distance stages represented by (1) to (7), determination stages are set to (1) to (8) and, for each determination stage, constant current supplies of upper 3 bits are combined to obtain a desired set current.

Figure 7:
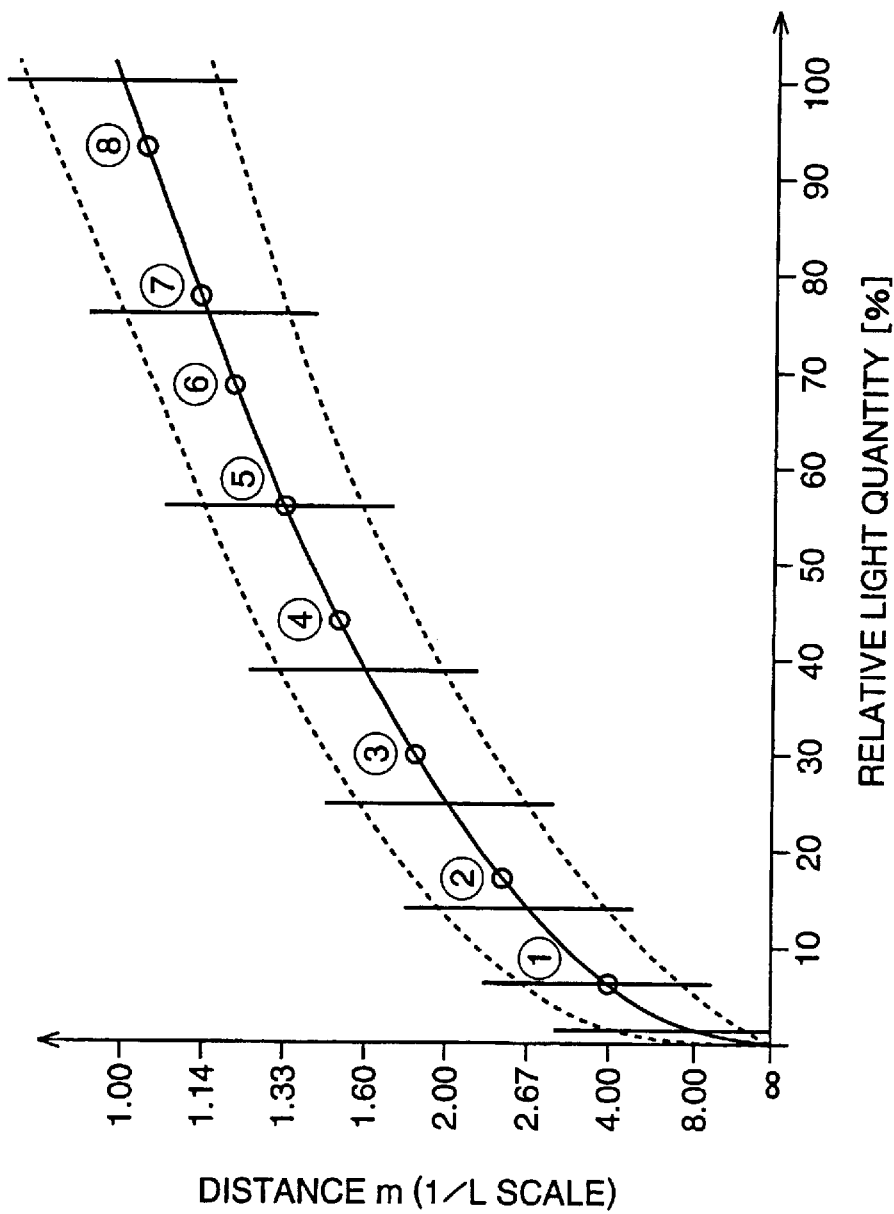
FIG. 7 is a graph showing a relation between a distance and a relative light quantity.

A graph thereof is shown in FIG. 7. In the graph of FIG. 7, distance stages corresponding to an excessive focus sequence are indicated by vertical bars, and determination stages set in accordance with the table view of FIG. 6 are presented by (1) to (8). As apparent from the graph, the determination stages are substantially on a theoretical characteristic curve of a distance/relative light quantity. However, no accurate correspondence is always present between the distance stages and the determination stages. That is, though variance occurs in intervals of the determination stages (1) to (8), steps finer than theoretical set steps are formed to increase accuracy. Because of the nature of light quantity determination, high accuracy is not necessary, and a main object is to obtain effectiveness of multiple stages compared with the conventional 2-stage light quantity determination. The determination stages (1) to (8) can be partially omitted to realize setting of a smaller number of steps. The foregoing has been based on 4 bits, but the same applies in cases other than 4 bits.

The circuitry unit 3 of the range finder shown in FIGS. 1(A) and 1(B) is constituted of, for example in order to execute ranging based on a relation between the distance and the relative light quantity shown in FIG. 7, a light quantity determination circuit 4, a reference level setting circuit 5, and a control circuit 6. As described above, the light quantity determination circuit 4 includes a signal comparator to comparing a level of a detection signal based on a light quantity with a predetermined reference level to determine the light quantity. The reference level setting circuit 5 supplies in a switchable manner a plurality of reference levels preset in multiple stages in accordance with a distance. The control circuit 6 controls the reference level setting circuit 5 to execute a plurality of determinations based on a predetermined algorithm while switching the reference levels, and specifies a distance to the object based on the thus obtained results. This algorithm limits a distance range to 2 divisions on either one of far and near sides at one determination, executes next determination within the distance range limited to the 2 divisions to further limit it to 2 divisions, and repeats such determinations to finally specify a distance to the object. The algorithm repeats far and near binary determinations at one determination, and proceeds to next determination at a stage where one of far and near determination results is obtained by a prescribed number of times. In this case, at a point of time when far and near binary determination reverse to the last determination result appears at the determination, the algorithm decides a determination result reverse to the last determination. If both far and near binary determinations are included in one determination, the algorithm lastly specifies a distance to the object based on next determination.

Figure 8:
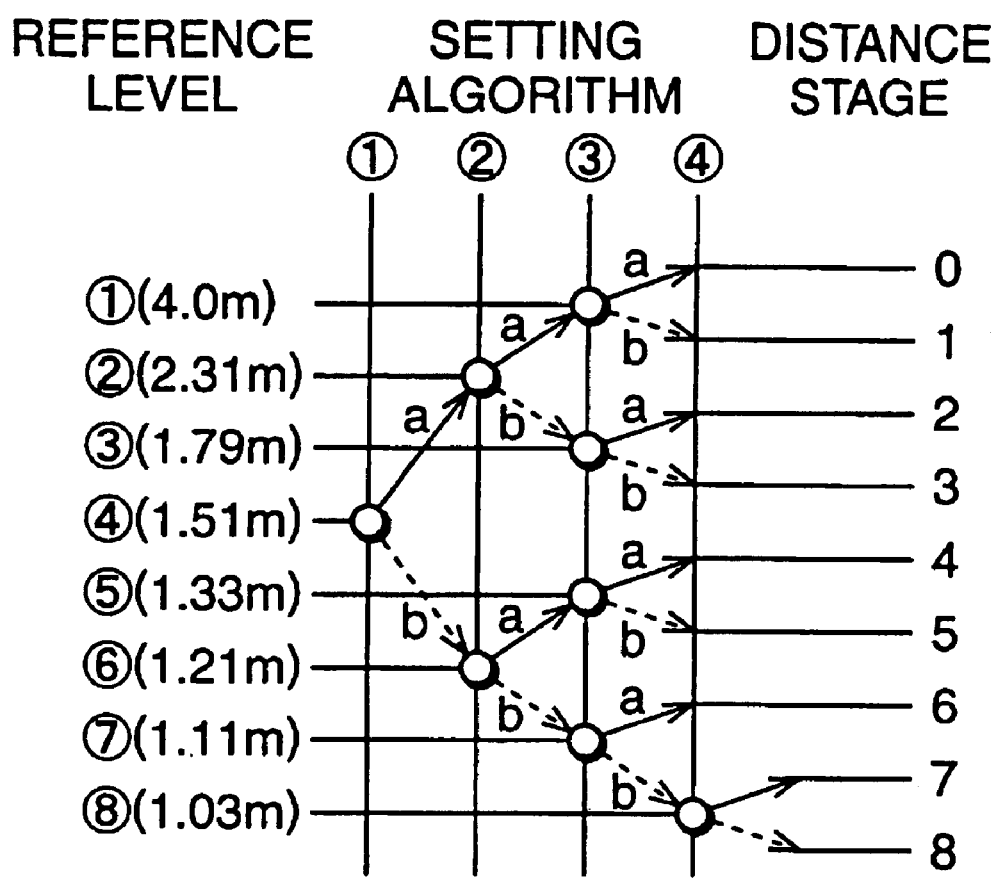
FIG. 8 is a schematic diagram showing an algorithm of multistage determination in the optical range finder of the present invention.

Now, the algorithm will be specifically described by referring to FIG. 8. In a shown example, reference levels are set to 8 stages of (1) to (8). A numeral in the parenthesis attached to each reference level denotes a distance to a corresponding object. A setting algorithm basically executes four sessions of determinations from (1) to (4) to specify a distance to the object. A result of the specification is represented as a distance stage on the right side of the diagram. Especially if the multistage range finder is applied for automatic focus adjustment of a camera, this distance stage corresponds to a focus setting stage of a lens.

First determination (1) is executed by selecting the reference level (4). In the drawing, a mark o indicates a determination point. If the object is determined to be in a far distance side as a result of the first determination (1) using the intermediate reference level (4), determination a is decided. On the other hand, if the object is determined to be in a distance side nearer than a distance 1.51 m corresponding to the reference level (4), determination b is decided. A route of second determination and after is decided in accordance with the determination a or b. For example, if the determination a is decided in the first determination (1), second determination (2) is executed by using the reference level (2). Thus, the distance range is limited to 2 divisions in one of far and near sides at one determination, next determination is executed within the 2-division limited distance range to further limit the distance range to 2-sub divisions, and these determinations are repeated to finally specify a distance to the object. Accordingly, compared with the case of executing determination by sequentially scanning up or down the reference levels, the total session number of determinations can be reduced.

In addition to the foregoing basic algorithm, several partial algorithms are further employed. In the first partial algorithm, at each determination point indicated by the mark o, determination is repeated by n times by the same reference level. Here, n denotes an odd number of times. If the count of determinations of a is ax, a is held when ax>(n−1)/2 is reached. If the count of determinations of b is bx, b is held when bx>(n−1)/2 is reached. For example, if n=11 is set, the stage is finished at a point of time when the same determination is made 6 times. That is, in the first partial algorithm, far and near binary determination a and b is repeated at one session of determination and, at a stage where one of far and near determinations appears first by a prescribed number of times, the process proceeds to a next session of the determination. Namely, the first partial algorithm is designed to enable the light quantity determination circuit to repeat a comparison of the signal level of the detection signal with the reference level and to count the results of the comparison in terms of a far side and a near side, such that one session of the binary determination of the light quantity is finished when the count of either of the far side and the near side reaches a predetermined number.

In a second algorithm, if reverse determination is in involved in a determination content of the current session in contrast to the last session, at a point of time when the determination reverse to the previous session appears at the current determination session, a result of the current determination session is held to be reverse to that of the past determination session, whereby the number of repetitions is reduced. For example, assuming that a determination result of the last session is a, if the result a similarly appears at first time at the current session, the result a may be repeated by a predetermined number of times in accordance with the above-described first partial algorithm. Similarly, if a determination result of the last session is b, and the result b also appears at first time at the current session, the result b may be repeated by a predetermined number of times in accordance with the first algorithm. As a result, continuous appearance of the result b is highly probable, and there is a high probability that the current determination session will become b. On the other hand, assuming that a result of the last determination session is a, for example if b appears at first time at the current session, a determination result must be set to b immediately at this point of time to avoid repeat of determination. Thus, determination time can be shortened. That is, if determinations are reverse to each other between the current session and the last session, since the determination results highly probably become opposite to each other, repeated determination is omitted. As described above, in the second partial algorithm, at a point of time when far or near binary determination reverse to the determination result of the last session appears at the current session, a determination result reverse to that of the last session is decided. Namely, the second partial algorithm is designed to enable the light quantity determination circuit to settle a current session of the binary determination in reverse to a previous session of the binary determination when a result of the comparison reverse to those results of the comparison involved in the previous session is observed in the current session of the binary determination.

In the third algorithm, if both far and near binary determinations are included in one session of determination, a distance to the object is lastly specified based on a next session of determination. If opposing determination results a and b both appear, it is easily estimated that a selected reference level is near a target level. Thus, next session is set as a last session to discontinue determinations thereafter. Therefore, total ranging time can be shortened. Namely, the third algorithm is designed to enable the light quantity determination circuit to make a next session of the binary determination final when a current session of the binary determination involves split results of the comparison splitting between the far side and the near side, thereby specifying the distance to one of the multiple stages at the next session of the binary determination.

Figure 9:
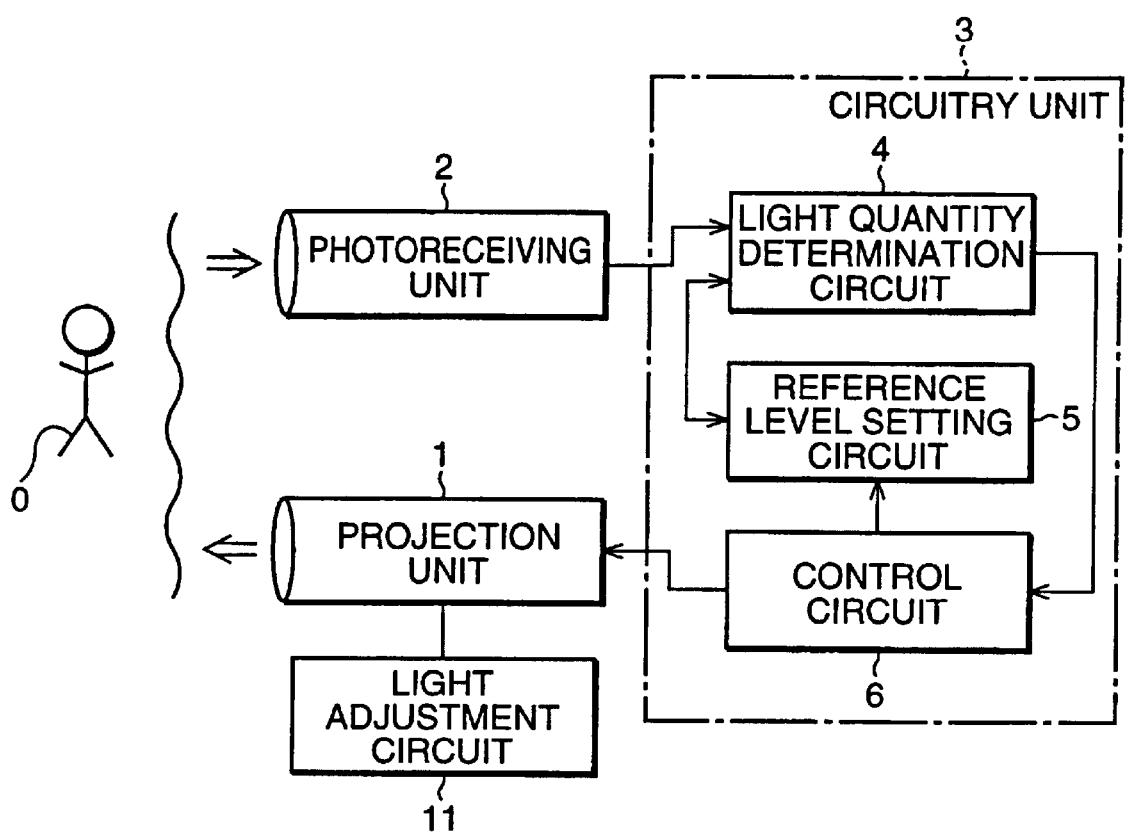
FIG. 9 is a schematic diagram showing another embodiment of an optical range finder of the present invention.

FIG. 9 is a schematic view illustrating another embodiment of the optical range finder of the present invention. To facilitate understanding, portions corresponding to those of the embodiment shown in FIG. 1 are denoted by corresponding reference numerals. As shown, the optical range finder is constituted of a projection unit 1, a photoreceiving unit 2, and a circuitry unit 3 as basic components. These physical components are as shown in FIG. 13. The projection unit 1 includes an infrared-emitting diode, a lens and the like, and projects optical flux to an object 0. The photoreceiving unit 2 includes a lens, and a light detecting element such as a photodiode, and receives the optical flux reflected to be returned from the object 0. The lens uses a converging function of a used element, and the lens may be omitted depending on a used light quantity. The light detecting element outputs a detection signal in accordance with the received light quantity, for example at a current level. The circuitry unit 3 measures a distance to the object 0 based on the detection signal outputted from the photoreceiving unit 2 in multiple stages.

The circuitry unit 3 is constituted of a light quantity determination unit 4, a reference level setting circuit 5, and a control circuit 6. The light quantity determination circuit 4 includes a single comparator for comparing a level of the detection signal based on the light quantity with a predetermined reference level to determine the light quantity. The reference level setting circuit 5 supplies in a switchable manner a plurality of reference levels preset in multiple stages in accordance with a distance. The control circuit 6 controls the reference level setting circuit 5 to execute a plurality of determinations for one measurement while switching the reference levels, and species a distance to the object 0 based on the thus obtained results.

The optical range finder is further provided with a light quantity adjustment unit 11. The light quantity adjustment unit 11 adjusts a light quantity of optical flux projected from a light emitting element of the projection unit 1 beforehand. Specifically, this light quantity adjustment unit 11 is constituted of a group of parallel resistive elements and a group of serial resistive elements. The group of parallel resistive elements is connected in parallel to the light emitting element to be selected, and a flow-dividing path of current flowing through the light emitting element is formed to execute primary adjustment of a light quantity. Accordingly, a light quantity level can be shifted in a wide range enabling absorption of various error factors. On the other hand, the group of serial resistive elements is connected serially to the light emitting element to be selected, and current flowing through the light emitting element is finely regulated to execute secondary adjustment of the light quantity. In other words, combined resistance of the group of serial resistive elements can be finely selected, whereby precise adjustment can be made of the light quantity level. By combining the group of the parallel resistive elements with the group of serial resistive elements, it is possible to execute wide-ranging and highly accurate calibration of the light quantity multiple range finder. The group of serial resistive elements is set such that each resistance value can be in an arithmetic relation where 2 is a base.

A specific constitutional example of the projection unit 1 and the light quantity adjustment unit 11 included in the optical range finder shown in FIG. 9 is included in the embodiment described above with reference to FIG. 2. Especially paying attention to the projection unit, a pulse is supplied through a buffer B and a transistor Tr to an infrared LED 1a by a timing circuit 16. The infrared LED 1a executes power backup by a capacitor C.

Resistors R0, R1, R2, R1', R2' are connected through a solder switch or the like to the LED 1a so as to be selected, to constitute the light quantity adjustment unit 11. The light quantity adjustment unit 11 combines connections of a plurality of resistors such that photoelectric current in the photodiode 2a side can become a set value. This adjustment normally needs to be executed once at an assembling stage, and thus the plurality of resistors R is properly selected to be connected by the solder switch or the like at the adjustment stage.

The light quantity adjustment unit 11 is constituted of a group of parallel resistive elements R1' and R2', and a group of serial resistive elements R0, R1 and R2. The group of parallel resistive elements R1', R2' is connected in parallel to the LED 1a by the solder switch to be selected, and a flow-dividing path of current flowing through the LED 1a is formed to execute primary adjustment of a light quantity. On the other hand, the group of serial resistive elements R0, R1, R2 is serially connected to the LED 1a similarly by the solder switch to be selected, and current flowing through the LED 1a is regulated to execute secondary adjustment of the light quantity.

In the example of FIG. 2, the LED 1a is driven by constant voltage from the timing circuit 16 through the transistor Tr and the buffer B. During power supplying, internal impedance of the capacitor C lowers its terminal voltage to, for example about 4.5 V. In this case, voltage between a collector and an emitter of the transistor Tr is about 0.5 V, forward voltage VF becomes about 3.0 V, and voltages applied to both ends of the group of serial resistive elements R0, R1, R2 are about 1 V. A resistance ratio of R0, R1, and R2 is, for example 1:2:4, and set to be in an arithmetic relation where 2 is a base. In the case of constant voltage driving, since voltages of only about 1 V are applied to R0, R1 and R2, a current control ratio by the resistors becomes small. Accordingly, for a resistance ratio, practically sufficient control accuracy can be obtained even in a 3-bit constitution. For example, assuming that R1 is 1.5 Ω, R2 to 2.4 Ω, and R3 to 4.7 Ω, if only R0 is selected, current IF flowing through the LED 1a is 0.85 A. If R0 and R2 are combined, current becomes 0.96 A. If R0 and R1 are combined, current becomes 1.03 A. If all R0, R1 and R2 are combined, current becomes 1.05 A. Adjustment can be made by about 10% width, and control accuracy is practically sufficient.

Figure 10:
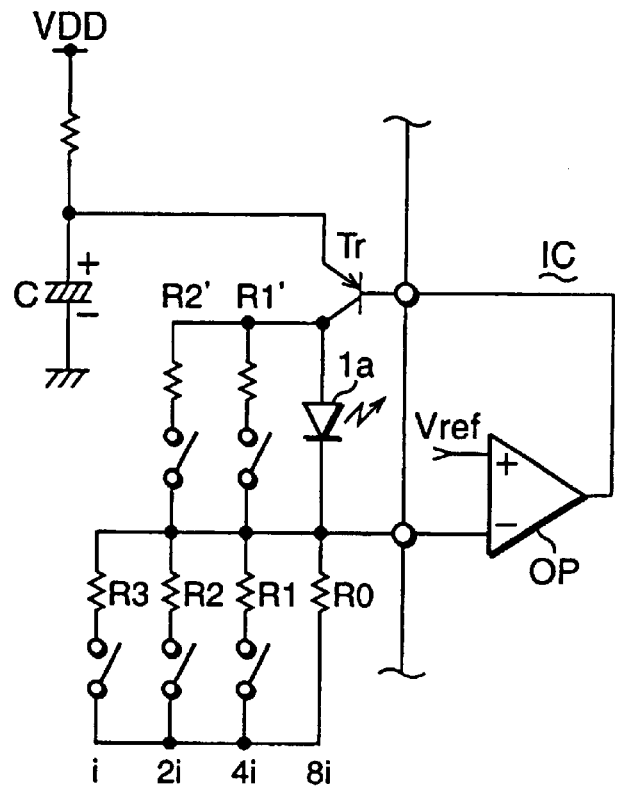
FIG. 10 is a circuit diagram showing another example of a light quantity adjustment unit included in the optical range finder of the present invention.

FIG. 10 is a circuit diagram showing another embodiment of the light quantity adjustment unit. According to this embodiment, a light emitting diode 1a is subjected to constant current driving by a transistor Tr and a differential amplifier OP. Current setting resistors included in a group of serial resistive elements are four, i.e., R0, R1, R2, and R3, and a resistance ratio is set to 1:2:4:8. A group of parallel resistive elements includes 2 current level shifting resistors R1' and R2'. Each resistor is connected to a terminal of the light emitting diode 1a by a switch. This switch may be an electric switch such as a solder switch or a transistor. Among the current setting resistors R0 to R3 having a binary ratio, R0 is always connected not through any switches, and it has a minimum resistance value. If a largest bit is 8i, set current becomes 8i to 15i. However, in place of the 4-bit constitution, a 3-bit constitution may be employed. In this case, set current becomes 8i to 14i. R1' and R2' are connected in parallel to the light emitting diode 1a. If forward voltage of the light emitting diode 1a is VF, current of VF/R1', and VF/R2' is bypassed to be subtracted from the set current. Thus, a role of current level shifting is played. Current flowing through the light emitting diode 1a becomes a combination of setting of R0 to R3 with magnification by R1' and R2'. Normally, −10 to 15%/R1' or R2' is set.

The optical range finder executes, considering variance in a light quantity, calibration by light quantity adjustment beforehand. Variance factors may be variance caused by element characteristics such as light emitting efficiency of the LED or receiving sensitivity of the photodiode, and variance caused by a processing circuit included in the raging IC such as set current of the light emitting diode, the light quantity setting circuit or determination level setting. A variance width of each element is assumed to be 4 types of ±20%, and reach ±40% by square average. On the other hand, for adjustment accuracy, if a determination point distance is basically a sequence of 1, 2/3, 2.4, . . . , since a relative light quantity per stage for a far distance can be considered to be about twice, accuracy of each step may be reduced by one digit to be about 10%. In the case of shown constant current driving, current amounts of 8 to 15, and resolution 1 can be obtained by R0 to R3. The R1' and R2' are for obtaining a level shifting operation, and shifting of about 10 to 20% is set. In such setting, 10% is obtained for adjustment accuracy, and R0 to R3 are combined with R1' to R2' to obtain ±30 to 40% for an adjustment width.

Figure 11:
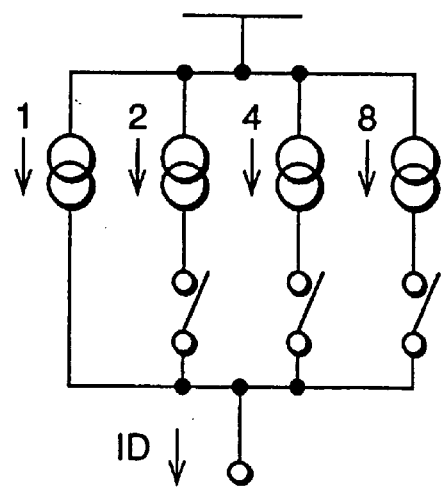
FIG. 11 is a circuit diagram showing another example of a reference level setting circuit included in the optical range finder of the present invention.
Figure 12:
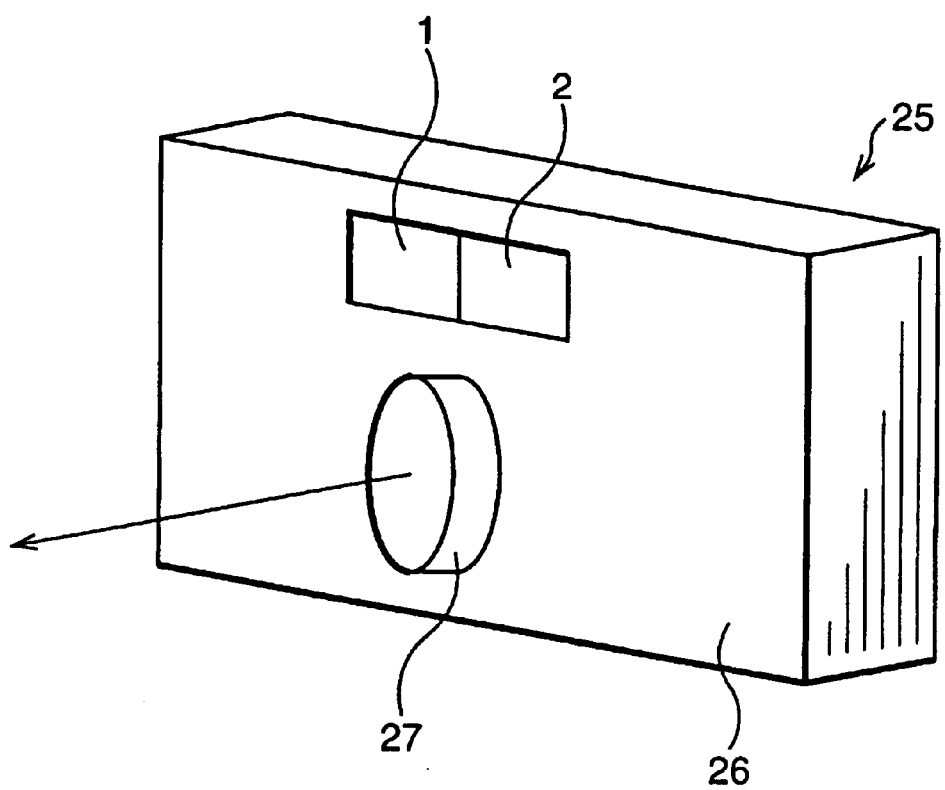
FIG. 12 is a schematic perspective view showing a camera incorporating a conventional light quantity range finder.

FIG. 11 is a schematic view showing another constitutional example of a reference level setting circuit. The reference level setting circuit shown in FIG. 2 is constituted of the constant current circuit 3a, and the current setting circuit 3b. In this embodiment, in place of the constant current circuit 3a constituted of the constant current supply, the constant voltage diode D1, and the transistor Tr2, constant current ID of a plurality of levels is used by constant current supplies of an geometrical sequence where 2 is a base, and a switch.

As described above, according to the present invention, only by switching the determination levels in the typical simple circuitry based on the binary determination, the multistage ranging can be executed, whereby accuracy of the optical range finder can be increased. In addition, since the determination levels can be set to values corresponding to the set distance stages, the optimal number of stages can be properly selected. The present system obtains a determination level near an actual distance by switching the determination levels to repeat a plurality of binary determinations, and a combination of both hardware and software means enables an increase of ranging accuracy while circuit simplicity is maintained.

Especially, according to the present invention, the algorithm of multistage determination is improved to specify a distance of the object by the smallest number of determinations.

Furthermore, according to the present invention, the electric current adjustment for setting the light quantity of the light emitting element is executed by a combination of two resistors, i.e., the selection of a setting resistor and the selection of a switch resistor disposed in parallel with the light emitting element. Thus, adjustment accuracy corresponding to the small number of bits can be increased to a practical level, and an adjustment width can be set large, whereby adjustment totally corresponding to a system variance amount can be effectively executed.

What is claimed is:
1. An optical range finder having a projection unit including a light emitting element for projecting optical flux to an object, a light quantity adjusting unit for provisionally adjusting a light quantity of the projected optical flux, a photoreceiving unit for receiving the optical flux returned from the object and outputting a detection signal in accordance with a light quantity of the received optical flux, and circuitry unit for conducting a measurement of a distance to the object based on the detection signal, wherein the circuitry unit comprises:
  a light quantity determination circuit for comparing a signal level of the detection signal with a reference level to carry out binary determination of the light quantity of the returned optical flux;
  a reference level setting circuit for switchably supplying a plurality of reference levels to the light quantity determination circuit, the reference levels being preset in correspondence to multiple stages of the distance; and a control circuit for controlling the reference level setting circuit to supply the reference levels while switching the reference levels so as to enable the light quantity determination circuit to execute a plurality of the binary determination with the supplied reference levels for one measurement, thereby specifying the distance to one of the multiple stages based on the thus obtained plurality of the binary determination, and wherein the light quantity adjustment unit comprises: a group of parallel resistive elements which are selectively connected in parallel to the light emitting element for forming bypasses of electric currents flowing through the light emitting element to thereby execute a primary adjustment of the light quantity; and another group of serial resistive elements which are selectively connected in series to the light emitting element for regulating the electric current flowing through the light emitting element to thereby execute a secondary adjustment of the light quantity.

2. The optical range finder according to claim 1, wherein the reference level setting circuit sets the reference levels in correspondence to the multiple stages of the distance where inverse numbers of the distance of the multiple stages are arranged in an arithmetic series.

3. The optical range finder according to claim 1, wherein the reference level setting circuit sets the reference levels in correspondence to the multiple stages of the distance where the distance is divided into the multiple stages based on a harmonic sequence (1/2, 1/3 ... 1/n).

4. The optical range finder according to claim 3, wherein the reference level setting circuit comprises a plurality of current supplies arranged in parallel with each other to output different current amounts, the plurality of the current supplies being set so that the respective current amounts may be arranged in a geometric series where 2 is a base, and a switch for switchably combining the current supplies to generate a multiple of current amounts such that the multiple of the current amounts are supplied to the light quantity determination circuit as the reference levels.

5. The optical range finder according to claim 4, wherein the plurality of the current supplies comprise a single current source and a plurality of resistive elements connected to the single current source to define the plurality of the current supplies generating the respective current amounts, the resistive elements having resistance values set in the geometric series where 2 is a base.

6. The optical range finder according to claim 4, wherein the plurality of the current supplies include a current supply for outputting a minimum current amount appropriate to a reference level corresponding to the farthest stage of the distance.

7. The optical range finder according to claim 6, wherein the plurality of the current supplies comprise at least four current supplies where the respective current amounts are set to 1:2:4:8, and these four current supplies are combined to set the multiple of the current amounts appropriate for the reference levels corresponding to the stages of the distance.

8. The optical range finder according to claim 7, wherein the four current supplies include a current supply which outputs a minimum current amount and which is always combined to the remaining current supplies in providing any of the reference levels.

9. An optical range finder having a projection unit for projecting optical flux to an object, a photoreceiving unit for receiving the optical flux returned from the object and outputting a detection signal in accordance with a light quantity of the received optical flux, and a circuitry unit for conducting a measurement of a distance to the object based on the detection signal, wherein the circuitry unit comprises:

a light quantity determination circuit for comparing a signal level of the detection signal with a reference level to effect a binary determination of the light quantity of the returned optical flux;

a reference level setting circuit for switchably supplying a plurality of reference levels to the light quantity determination circuit, the reference levels being preset in correspondence to multiple stages of the distance; and a control circuit for controlling the reference level setting circuit to sequentially supply the reference levels based on a algorithm while switching the reference levels so as to enable the light quantity determination circuit to sequentially execute sessions of the binary determination with the supplied reference levels for one measurement, thereby specifying the distance to one of the multiple stages according to the algorithm based on the sessions of the binary determination, where the algorithm is designed to specify the distance to one of a far zone and a near zone over the multiple stages of the distance at an initial session of the binary determination, then specify the distance to one of a far sub-zone and a near sub-zone within the specified one of the far zone and the near zone at a next session of the binary determination, and specify the distance to one of the multiple stages within the specified one of the far sub-zone and the near sub-zone at a further session of the binary determination.

10. The optical range finder according to claim 9, wherein the algorithm is designed to enable the light quantity determination circuit to repeat a comparison of the signal level of the detection signal with the reference level and to count the results of the comparison in terms of a far side and a near side, such that one session of the binary determination of the light quantity is finished when the count of either of the far side and the near side reaches a predetermined number.

11. The optical range finder according to claim 10, wherein the algorithm is designed to enable the light quantity determination circuit to settle a current session of the binary determination in reverse to a previous session of the binary determination when a result of the comparison reverse to those results of the comparison involved in the previous session appears the current session of the binary determination.

12. The optical range finder according to claim 10, wherein the algorithm is designed to enable the light quantity determination circuit to make a next session of the binary determination final when a current session of the binary determination involves split results of the comparison splitting between the far side and the near side, thereby specifying the distance to one of the multiple stages at the next session of the binary determination.

13. The optical range finder according to claim 1, wherein the group of the serial resistive elements are set so that respective resistance values of the serial resistive elements may be arranged in a geometric series where 2 is a base.

14. The optical range finder according to claim 1, wherein the light emitting element is driven under constant voltage control.

15. The optical range finder according to claim 1, wherein the light emitting element is driven under constant current control.

* * * * *